United States Patent
Janssen

[15] 3,646,431
[45] Feb. 29, 1972

[54] APPARATUS FOR MEASURING THE CONCENTRATION IN PARAMAGNETIC GAS OF A GAS MIXTURE

[72] Inventor: Sylvain Jean Janssen, Neuilly-sur-Seine, France

[73] Assignee: Compagnie Des Compteurs, Paris, France

[22] Filed: Oct. 24, 1969

[21] Appl. No.: 869,258

[30] Foreign Application Priority Data

Oct. 31, 1968 France...................................172128

[52] U.S. Cl............................................................324/36
[51] Int. Cl..........................................................G01r 33/12
[58] Field of Search......................................................324/36

[56] References Cited

UNITED STATES PATENTS 2,416,344 2/1947 Pauling.....................................324/36
2,448,111 8/1948 Nicolai......................................324/36

Primary Examiner—Alfred E. Smith
Attorney—Pierce, Scheffler & Parker

[57] ABSTRACT

Device for measuring the paramagnetic gas concentration of a gas mixture, constituted by a pick up of general flat shape placed perpendicularly to the electric fluxes of a magnetic field having abrupt intensity variations, said pick up comprising at least one member composed of a flat metal part and an adjacent closed cell-shaped metal part filled with a non-paramagnetic gas or put under a vacuum, connected to the preceding part in a region of the airgap where the induction is uniform, each of these parts respectively having equivalent sections of metal in the regions where the field intensity varies abruptly.

8 Claims, 5 Drawing Figures

APPARATUS FOR MEASURING THE CONCENTRATION IN PARAMAGNETIC GAS OF A GAS MIXTURE

A certain number of devices are already known enabling the oxygen content of a gas mixture to be measured. Most of them use a property which distinctly differentiates the oxygen from other usual gases: its paramagnetism.

It is known that in the magnetic induction field $B$, the partial pressure $P$ of a paramagnetic gas is proportional to its volume susceptibility $X_v$ and to the square of the induction $B$:

$$P = KX_vB^2$$

Advantage is taken of this phenomenon for producing mechanical stresses on test bodies or probes suitably arranged in the air gaps separating the polar parts creating these fields, the paramagnetic gas filling the space between the polar parts and being able to circulate therein.

Known devices essentially comprise a pickup member forming a test body or probe placed in a discontinuity of a magnetic field and subjected to repulsion forces. These forces only exert on the solid bodies if an abrupt variation exists in the field, this showing a pressure difference on each side of the discontinuity in the presence of a paramagnetic gas. This differential pressure is so much the greater as the paramagnetic susceptibility of the mixture is considerable, and hence that the paramagnetic gas concentration is high. Such forces are generally not very important, and on this account, are difficult to work, so that it is hardly possible, in the present state of the technique, accurately to measure oxygen contents of slight value, in the region of $10^{-3}$ in volume, for instance.

The known devices have some disadvantages. Actually, the repulsion force varies with the position of the pick up, and its measuring cannot be exploited unless the pick up retains a strictly fixed position in relation to the polar parts. This disadvantage may be overcome by means of suitable dimensioning of the pick up and polar parts, but we are then led to generally complicated forms. Also, it is necessary to make the best use of the abrupt variation or discontinuity of the field, and for this, rather voluminous pick ups are often employed. This results in the repulsion force/pickup mass ratio being unfavorable, most of the time. Also, it must not be forgotten that no pick up is immune from an action on the part of the induction field. Actually, whether the pick up is diamagnetic or paramagnetic, it undergoes mechanical actions, in either case. If it is paramagnetic, it undergoes parasitic forces varying with the temperature, and the zero of the system is unstable. If it is diamagnetic, the parasitic forces vary in a less appreciable manner with the temperature, but are sufficiently disturbing to make it necessary however to set up a fixed opposed force, which is the more difficult to maintain stable, as it is weak.

The present invention seeks especially to avoid the abovementioned disadvantages.

It also consists of producing a device comprising means enabling the discontinuity of the field to be concentrated in spaces as reduced as possible, to follow these spaces where the induction varies abruptly by other spaces where the induction is uniform, to take advantage of all effects of addition of forces or torques, and to eliminate all parasitic forces coming from the paramagnetic or diamagnetic character of the pick up subjected to the action of the gas.

The invention has for its object a device for measuring the paramagnetic gas concentration of a gas mixture, of the type constituted by a pick up of general flat shape forming a test body placed perpendicularly to the electric fluxes of a magnetic field having abrupt intensity variations, said device being characterized in that the pick up comprises at least one member composed of a flat metal part and an adjacent closed, cell-shaped metal part filled with a nonparamagnetic gas or put under a vacuum, connected to the preceding part in a region of the air gap where the induction is uniform, each of these parts respectively having equivalent sections of metal in the regions where the field intensity varies abruptly.

Other characteristics of the invention will be revealed by the description which follows, made in conjunction with the accompanying drawings, concerning various embodiments of the invention given by way of nonrestrictive examples.

Figure 1:
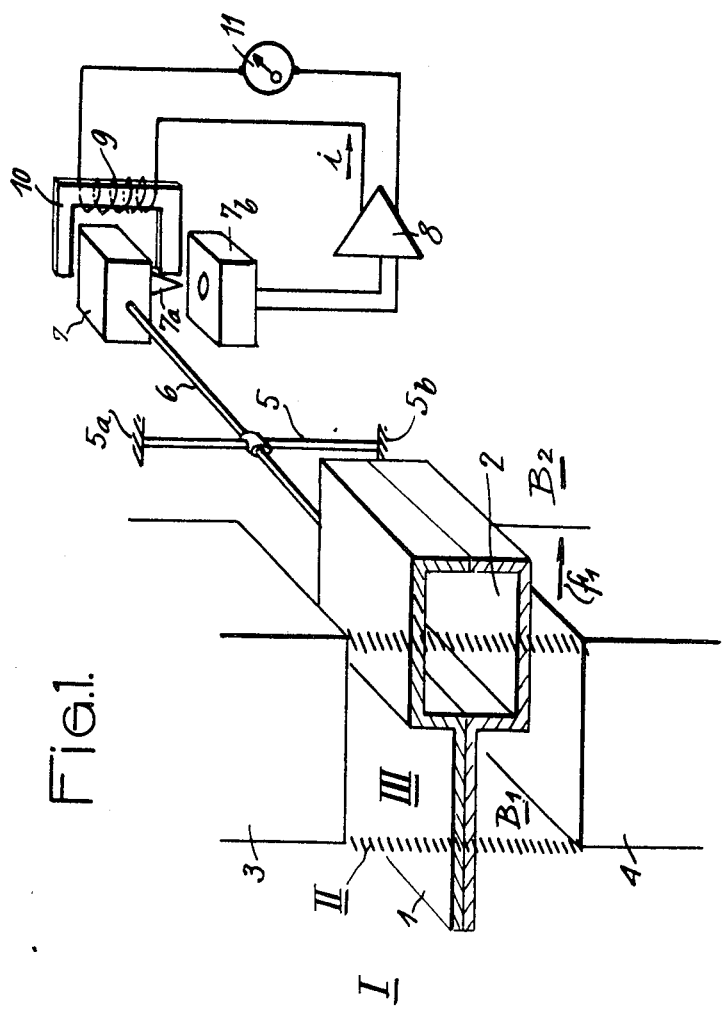
FIG. 1 shows diagrammatically a first embodiment comprising a pick up with a single element.

In FIG. 1, one sees the single-member pick up made, for instance, of aluminum and comprising a solid part 1 and a part 2 adjacent to part 1. Part 2 occurs in the shape of a cell filled with a nonparamagnetic gas, $CO_2$ gas or nitrogen, for instance, but it can also be emptied of all gas. The pick up is placed perpendicularly to the electric flux of a magnet whose respective polar parts 3 and 4 define an airgap reduced to a few millimeters, four, for instance.

Figure 2:
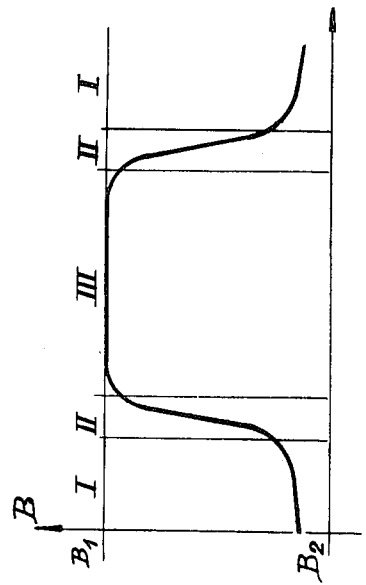
FIG. 2 is an explanatory curve of the working.

FIG. 2 shows the behavior of the intensity of the induction field B set up by said polar parts. The airgap of the magnet forms a region III, of high and uniform induction $B_1$, 7,000 gauss for instance, on either side of which there is a region I where the induction $B_2$ is low, 1,000 gauss for instance. Between the regions I and III is a region II where the intensity of the field varies abruptly (discontinuity).

The pick up is so placed that the connection of its parts 1 and 2 occurs inside said airgap, i.e., in the region of intensity $B_1$. Owing to the way in which the polar parts 3 and 4 are made, the discontinuity of the field is concentrated to a maximum and the region II is as reduced as possible.

The two parts 1 and 2 of the pick up are made in a suitably bent single piece, or, as shown in FIG. 1, in two distinct parts fixed one on the other, for instance, by soldering. Whatever the embodiment, the thickness of the metal walls are so chosen that the parts 1 and 2 respectively have equivalent solid sections in the regions II with an abrupt field variation, i.e., straight with the edges of the magnet, hatched in FIG. 1, whereas the geometric sections corresponding to their external contour are distinctly different. An arrangement of this kind enables parasitic effects to be eliminated coming from the paramagnetism or diamagnetism of the material forming the pick up, every variation of volume of solid matter being exclusively in the regions of induction $B_1$ or $B_2$.

As explained above, for a gas of given volume susceptibility, the pressure is proportional to the square of the intensity of the magnetic induction field. Thus, the gas pressure in region I is $P_2 = KX_vB_2^2$ whereas the gas pressure in region III is $P_1 = KX_vB_1^2$.

The test body is thus subjected on either side of region II to the pressure difference $\Delta p = KX_v(B_1^2 - B_2^2)$. Allowing for the fact that $B_2$ (region I) can be made very weak by the suitable manufacture of the polar parts, the pressure difference $\Delta P$ is slightly different from $\Delta p = KX_vB_1^2$. The test body is thus submitted to a piston effect in the direction of $f_1$ and has a tendency to come out from the strong induction region III. According to what has been explained above, this piston effect is the more important for a given field $B_1$ as $X_v$ is important and that the paramagnetic gas proportion is high.

For carrying out the measurement of the paramagnetic gas content, i.e., in oxygen, for instance of a gas mixture, it is thus necessary to measure this piston effect for an invariable induction. To this end, the test body, made by the parts 1 and 2, belongs to automatic reequilibrating force balance.

The induction fields $B_1$ and $B_2$ being considered as vertical and the test body horizontal, there is diagrammatically shown in FIG. 1 a force balance comprising a vertical pivot 5 with a slight or zero twist fixed to the frame of the apparatus at $5a$ and $5b$ and in whose middle a horizontal bar 6 is rigidly fixed. The bar 6 carries the test body on one side and a counterweight part on the other of magnetic material 7 so that when balanced the central part separating the parts 1 and 2 is in region III, said parts 1 and 2 projecting in their respective regions I.

A position detector 7a, 7b, of the optical type for instance, sends a control signal at its output to an amplifier 8 in the event of unbalance. The amplifier 8 sends a current $i$ into a coil 9 of an electromagnet 10 thus setting up a magnetic field acting on the counterweight 7 and tending to restore the balance. This current $i$ measured by an ammeter 11 is proportional to the strength of the piston effect produced on the test body by said pressure difference. The ammeter 11 thus measures the quantity of paramagnetic gas in the atmosphere in which the device is immersed.

Figure 3:
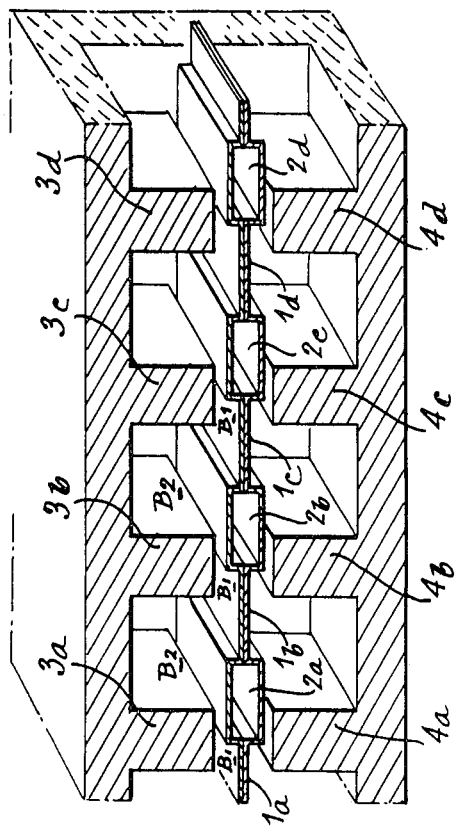
FIG. 3 is a perspective view of an alternative comprising a pick up with several members placed one behind the other following a linear device.
Figure 4:
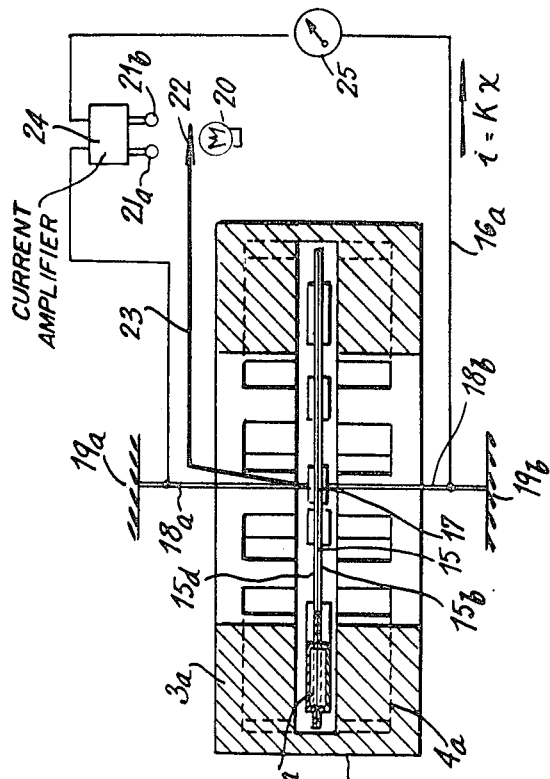
FIG. 4 shows a partially cutaway view of a second embodiment comprising several members placed one behind the other in a circular arrangement.
Figure 5:
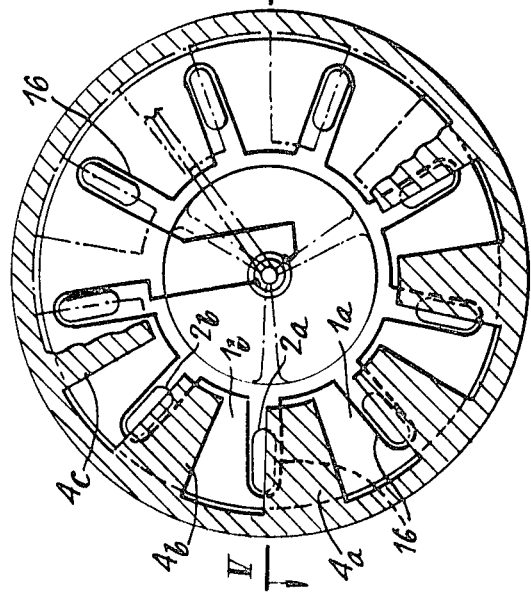
FIG. 5 is a section along the line V—V of FIG. 4.

In FIGS. 3, 4 and 5, one sees multiple member pick ups so devised as to permit the addition of forces or torques by using multiple polar part magnets whose airgap alternately has high-induction regions $B_1$ and low induction regions $B_2$.

In the embodiment shown in FIG. 3, the pick up or test body comprises a series of integral members placed one after another in a linear arrangement, flat parts 1a, 1b, 1c, 1d alternating with cell parts 2a, 2b, 2c, 2d. The polar parts of the magnet 3a, 3b, 3c, 3d, on the one hand, and 4a, 4b, 4c, 4d, on the other, are aligned in a similar manner and respectively placed facing one another. Then, the pick up is in the form of a plate. Such a plate can be constructed by two plates stuck or soldered together and previously stamped so as to have transversal corrugations regularly spaced out that can be arranged facing each other. In this way, closed cells are defined in the finished plate inside of which a nonparamagnetic gas is introduced during construction, or in which a vacuum is set up.

As in the embodiment according to FIG. 1, the test body forms part of automatic reequilibrating force balance.

In the embodiment of FIGS. 4 and 5 which give an alternative of FIG. 3, the pick up comprises a series of integral members placed one after another in a circular arrangement, the flattened parts 1a, 1b....alternating with the cellular parts 2a 2b... The magnet is shaped like a crown whose polar parts 3a, 3b, 3c, 3d.... on the one hand, and the polar parts 4a, 4b, 4c, 4d... respectively facing them, on the other, are aligned in a similar manner. The pick up or test body then occurs in the shape of a disc 15. A disc of this kind can be made from two discs 15a, 15b stuck or soldered together and previously stamped so as to have radial corrugations regularly spaced out that are placed to face one another. Thus, closed cells are defined in the finished disc 15 inside of which a nonparamagnetic gas is introduced during construction, or in which a vacuum is set up.

A permanent induction field with periodical circular spatial variation $B_1 - B_2 - B_1 - B_2$ .... and of the same pitch as that of the corrugations defined above, enables a torque to be set up resulting from the addition of effects on each member of the pick up. This torque tends to make the disc revolve. A disc 15 of this kind is shown in FIGS. 4 and 5, itself forming reequilibrating motor. Actually, the uniform induction field $B_1$ (or even $B_2$ if it is not too weak) enables an opposing torque to be set up for reequilibrating, if a counter reaction current $i$ traverses a wire 16 (FIG. 4) fixed on the disc while forming loops around the cells. It is not necessary to create a very high-power ratio retroreaction, as because the existence of the wire loops, the driving torque is invariable for a slight rotation angle of the disc.

In FIGS. 4 and 5, one sees the disc 15 made of aluminum and comprising flattened parts 1a, 1b.... and cellular parts 2a, 2b... The disc is horizontal and placed in the spatial variation field $B_1 - B_2 - B_1 - B_2$... The wire 16 surrounds the cells in the manner shown in FIG. 4. The center of the disc comprises a contact 17 of insulating plastic material and is maintained on either side of the insulating material by two conducting metal rods 18a, 18b forming a pivot and fixed at 19a, 19b to the frame of the balance, the two rods being electrically connected in parallel with the wire 16, a reequilibrating circuit being, furthermore, connected to the rods 18a, 18b so that this circuit closes by the wire 16.

An optical position detector of the reequilibrating circuit comprises a transmitting lamp 20, two receiving diodes 21a, 21b and a vane 22 fixed to an arm 23 integral with the disc. The detector is so mounted that, when balanced, the vane 22 interrupts the light beam coming from the lamp 20. The diodes 21a, 21b are connected to the input of a current amplifier 24 whose output is connected by a conductor 16a to two rods 18a, 18b holding the disc.

In this embodiment, in the event of unbalance, the vane 22 no longer interrupts the light beam, so that the diodes 21a, 21b give a control signal at their outputs to the amplifier 24. The amplifier 24 sends a current $i$ into the wire 16 by means of the conductor 16a and conducting rods 18a, 18b. The current $i$ traversing the loops formed round the cells in the direction shown in FIG. 4, it happens the opposing torque as sought to cause restoring of the balance. The current $i$, measured by an ammeter 25, thus measures the quantity of paramagnetic gas according to the law $i = K X$, X being the more important as the proportion of paramagnetic gas is high in the atmosphere in which the device is immersed. In actual practice, the disc is not subjected to an angular movement for the restored equilibrium is instantaneous, so that the piston action set up on the cells is not disturbed as would be the case if the disc revolved.

The invention is not limited to the embodiments, shown and described in detail, for various modifications can moreover be applied to it without going outside of its scope.

I claim:

1. A device for measuring the concentration in paramagnetic gas of a mixture of gases comprising, a generator of constant magnetic field and delimiting at least one uniform airgap, a captor probe made of a nonferromagnetic material comprising at least one thin part extending partly into said airgap and partly outside of said airgap and at least one thick part extending also partly into said airgap and partly outside of said airgap, each of said at least one thin part being rigidly connected to the center of the end face of each of the at least one thick part to form a steplike configuration on both sides of said probe, said parts having equal wall thickness and said probe being immersed in said paramagnetic gas, a force balance supporting said captor probe so that the balance is under the influence of said captor probe by a differential pressure exerted on said thin and thick parts when a paramagnetic gas is present, the partial pressure of which is increased in said airgap by said magnetic field with respect to the partial pressure of said gas outside said airgap.

2. Device according to claim 1 in which the parts constituting the captor are closed and filled with a nonparamagnetic gas.

3. Device according to claim 1 in which the parts constituting the captor are sealed to delimit a closed housing in which vacuum is made.

4. Device according to claim 1 in which the generator of magnetic field is a multipole magnet and the captor probe comprises several sets of thin and thick parts rigidly connected together, number of poles being twice the number of sets of thin and thick parts.

5. Device according to claim 4 in which the magnet is linear as well as the captor probe.

6. Device according to claim 4 in which the magnet is ring shaped and the captor probe is disc shaped.

7. Device according to claim 1 in which said captor probe comprises two stamped pieces rigidly connected together with stamped portion thereof opposite one to the other.

8. Device according to claim 1 in which loops of electric wire are provided to surround said thick part and are connected together to constitute a flat winding, current supplying means being provided to feed said winding whereby said winding constitutes a rebalancing motor of said force balance carrying said captor probe.

* * * * *